United States Patent
Luo et al.

(10) Patent No.: US 12,413,068 B2
(45) Date of Patent: Sep. 9, 2025

(54) SHUTOFF DEVICE AND PHOTOVOLTAIC SYSTEM

(71) Applicant: ALTENERGY POWER SYSTEM INC., Zhejiang (CN)

(72) Inventors: Yuhao Luo, Zhejiang (CN); Dongming Zhou, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 35 days.

(21) Appl. No.: 18/564,118

(22) PCT Filed: Aug. 23, 2021

(86) PCT No.: PCT/CN2021/114009
§ 371 (c)(1),
(2) Date: Nov. 27, 2023

(87) PCT Pub. No.: WO2022/262112
PCT Pub. Date: Dec. 22, 2022

(65) Prior Publication Data
US 2024/0250520 A1    Jul. 25, 2024

(30) Foreign Application Priority Data
Jun. 16, 2021 (CN) .......................... 202110666148.9

(51) Int. Cl.
*H02H 7/20* (2006.01)
*H02J 3/38* (2006.01)
(Continued)

(52) U.S. Cl.
CPC ................. *H02H 7/20* (2013.01); *H02J 3/38* (2013.01); *H02J 13/00036* (2020.01); *H02S 40/36* (2014.12); *H02J 2300/24* (2020.01)

(58) Field of Classification Search
CPC ........ H02H 7/20; H02J 3/38; H02J 13/00036; H02J 2300/24; H02J 3/381; H02S 40/36;
(Continued)

(56) References Cited

U.S. PATENT DOCUMENTS 5,124,566 A * 6/1992 Hu ........................... H02H 3/24
307/116
11,190,021 B2 * 11/2021 Moslehi ................ H02M 3/158
(Continued)

FOREIGN PATENT DOCUMENTS

CN      109245713 A    1/2019
CN      111224424 A    6/2020
(Continued)

OTHER PUBLICATIONS

The 1st Office Action dated Aug. 23, 2021 for the Chinese Patent Application No. CN202110666148.9. English Translation of the 1st Office Action Provided by http://globaldossier.uspto.gov.
(Continued)

*Primary Examiner* — Daniel Kessie
*Assistant Examiner* — Brian K Baxter
(74) *Attorney, Agent, or Firm* — Yue (Robert) Xu; Apex Attorneys at Law, LLP

(57) ABSTRACT

A shutoff device, including a shutoff device control chip, where the shutoff device control chip includes a voltage output port, and a configuration module configured to adjust an output voltage of the voltage output port. Since the shutoff device control chip is provided in the shutoff device, and a voltage output port and a configuration module configured to adjust the output voltage of the voltage output port are provided in the shutoff device control chip, the shutoff device output can output different voltage values by configuring the configuration module. In this case, when a connection structure between the shutoff device and the
(Continued)

photovoltaic module in the photovoltaic system changes, it is only necessary to reconfigure the configuration module to achieve the purpose of adjusting the output voltage of shutoff device.

12 Claims, 8 Drawing Sheets

(51) Int. Cl.
  *H02J 13/00* (2006.01)
  *H02S 40/36* (2014.01)
(58) Field of Classification Search
  CPC ......... H02S 40/30; Y02E 10/56; Y02E 40/70; Y02E 60/00; Y04S 10/123; Y04S 10/18
  See application file for complete search history.

(56) References Cited

U.S. PATENT DOCUMENTS

| | | | | |
|---|---|---|---|---|
| 2005/0145209 | A1* | 7/2005 | Denz | F02N 11/087 361/29 |
| 2009/0213639 | A1* | 8/2009 | Toda | G11C 13/0002 365/175 |
| 2013/0271888 | A1* | 10/2013 | Falk | H10F 77/955 361/93.1 |
| 2014/0119072 | A1* | 5/2014 | Behrends | H02S 50/10 363/55 |
| 2017/0207620 | A1* | 7/2017 | Zhu | H02J 3/381 |
| 2018/0248359 | A1 | 8/2018 | Zou et al. | |
| 2021/0281065 | A1* | 9/2021 | Zhu | H02S 40/32 |
| 2021/0391710 | A1* | 12/2021 | Yang | H02J 3/381 |
| 2021/0408969 | A1* | 12/2021 | Bang | H03F 1/0227 |
| 2022/0294389 | A1* | 9/2022 | Luo | H02S 40/34 |
| 2024/0195179 | A1* | 6/2024 | Chen | H02M 7/537 |

FOREIGN PATENT DOCUMENTS

| | | |
|---|---|---|
| CN | 111313825 A | 6/2020 |
| CN | 112234818 A | 1/2021 |
| CN | 113258874 A | 8/2021 |
| EP | 3382763 A1 | 10/2018 |
| WO | 2016163304 A1 | 10/2016 |

OTHER PUBLICATIONS

International Search Report for PCT/CN2021/114009 mailed Feb. 24, 2022, ISA/CN.

* cited by examiner

SHUTOFF DEVICE AND PHOTOVOLTAIC SYSTEM

CROSS REFERENCE OF RELATED APPLICATION

The present application is the national phase of International Application No. PCT/CN2021/114009, titled "SHUTOFF DEVICE AND PHOTOVOLTAIC SYSTEM", filed on Aug. 23, 2021, which claims priority to Chinese Patent Application No. 202110666148.9, titled "SHUTOFF DEVICE AND PHOTOVOLTAIC SYSTEM", filed on Jun. 16, 2021 with the China National Intellectual Property Administration both of which are incorporated herein by reference in their entireties.

FIELD

The present disclosure relates to the technical field of photovoltaic power generation, and in particular to a shutoff device and a photovoltaic system.

BACKGROUND

Due to the renewable and clean nature of solar energy, grid-connected photovoltaic power generation technology has achieved rapid development. In a photovoltaic system, photovoltaic modules connected in series output direct current high voltage and pose high safety hazards. Therefore, in conventional technology, not only does an inverter in the photovoltaic system need to provide an arc protection function, but also a shutoff device needs to be added to the photovoltaic system to eliminate the direct current high voltage generated by photovoltaic strings connected in series.

Referring to FIG. 1, FIG. 1 is a schematic structural diagram of a conventional photovoltaic system. In the photovoltaic system shown in FIG. 1, one shutoff device is connected to one photovoltaic module. When the photovoltaic strings connected in series need to be turned off, a control signal is sent to each shutoff device by a shutoff controller to turn off a corresponding photovoltaic string. In order to avoid complete shutdown of the shutoff controller, it is necessary to provide a certain power supply voltage to the shutoff controller when the shutoff devices are turned off. In the photovoltaic system, a number m of the shutoff devices is the same as a number n of the photovoltaic modules. Assuming that an output voltage is $V_{off}$ when a shutoff device is turned off, when all the shutoff devices are turned off, an output voltage of the photovoltaic strings is: $V_{off}*m=V_{off}*n$. Referring to FIG. 2, FIG. 2 is another schematic structural diagram of the conventional photovoltaic system. In the photovoltaic system of FIG. 2, one shutoff device is connected to two photovoltaic modules. In this case, the number m of the shutoff devices is half of the number n of the photovoltaic modules. When all the shutoff devices in the photovoltaic system as shown in FIG. 2 are turned off, the output voltage of a photovoltaic string composed of various photovoltaic modules connected in series is $V_{off}*n/2$. Since a supply voltage of the shutoff controller is constant, in order to ensure that the same number of the photovoltaic modules in the photovoltaic system can work normally, the output voltage of the shutoff devices shown in FIG. 2 is required to be twice that of the shutoff devices shown in FIG. 1. Similarly, if a connection structure of the photovoltaic system is changed, where one shutoff device is connected to three or four photovoltaic modules, the output voltage of the shutoff devices will be required to be three or four times that of the shutoff devices shown in FIG. 1.

Since the output voltage of the conventional shutoff device is constant and cannot be modified, if the connection structure between the photovoltaic module and the shutoff device in the photovoltaic system changes, all shutoff devices in the photovoltaic system needs to be replaced as a whole to ensure the safe and stable operation of the photovoltaic system. Apparently, this structural adjustment of the photovoltaic system greatly increase a design cost for the photovoltaic system. At present, there is no effective solution to this technical problem.

SUMMARY

In view of the above, the purpose of the present disclosure is to provide a shutoff device with adjustable output voltage to reduce a design cost requiring for adjusting a connection structure between the shutoff device and a photovoltaic module in a photovoltaic system. The specific embodiments are as follows.

A shutoff device, including a shutoff device control chip, where the shutoff device control chip includes: a voltage output port, and a configuration module configured to adjust a output voltage of the voltage output port.

In an embodiment, the configuration module is a digital configuration module.

In an embodiment, the digital configuration module is provided with multiple digital channels.

In an embodiment, the configuration module is an analog configuration module.

In an embodiment, a first resistance is connected between the voltage output port and the analog configuration module, and a second resistance is connected between the analog configuration module and a ground.

In an embodiment, the shutoff device further includes: a remote server configured to send a target control instruction to the configuration module.

In an embodiment, the shutoff device further includes: a standby configuration module.

In an embodiment, a number of the standby configuration module is M, where M is greater than or equal to 1.

Correspondingly, a photovoltaic system is further provided in the present disclosure, and the photovoltaic system includes any one of the shutoff devices as described above.

It can be seen that, in the shutoff device provided in the present disclosure, since the shutoff device control chip is provided in the shutoff device, and a voltage output port and a configuration module configured to adjust the output voltage of the voltage output port are provided in the shutoff device control chip, the shutoff device output can output different voltage values by configuring the configuration module. In this case, when a connection structure between the shutoff device and the photovoltaic module in the photovoltaic system changes, it is only necessary to reconfigure the configuration module to achieve the purpose of adjusting the output voltage of shutoff device. Comparing with the conventional technology, by the setting the shutoff device in this way, the design cost requiring for adjusting the connection structure between the shutoff device and the photovoltaic module in the photovoltaic system can be significantly reduced. Correspondingly, a photovoltaic system provided in the present disclosure also has the aforementioned beneficial effects.

BRIEF DESCRIPTION OF THE DRAWINGS

In order to illustrate embodiments of the present disclosure or technical solutions in conventional technology more clearly, accompanying drawings for the embodiments or accompanying drawings for descriptions of conventional technology are briefly introduced below. Apparently, the accompanying drawings described below are only embodiments of the present disclosure, other drawings may be obtained according to the accompanying drawings provided without creative effort for those skilled in the art.

DETAILED DESCRIPTION OF THE EMBODIMENTS

Technical solutions in the embodiments of the present disclosure are clearly and completely described in conjunction with the accompanying drawings in the embodiments of the present disclosure. Apparently, the embodiments described are only some embodiments of the present disclosure, rather than all of the embodiments. All other embodiments obtained without any creative labor by those skilled in the art based on the embodiments of the present disclosure shall fall within the protection scope of the present disclosure.

Figure 1:
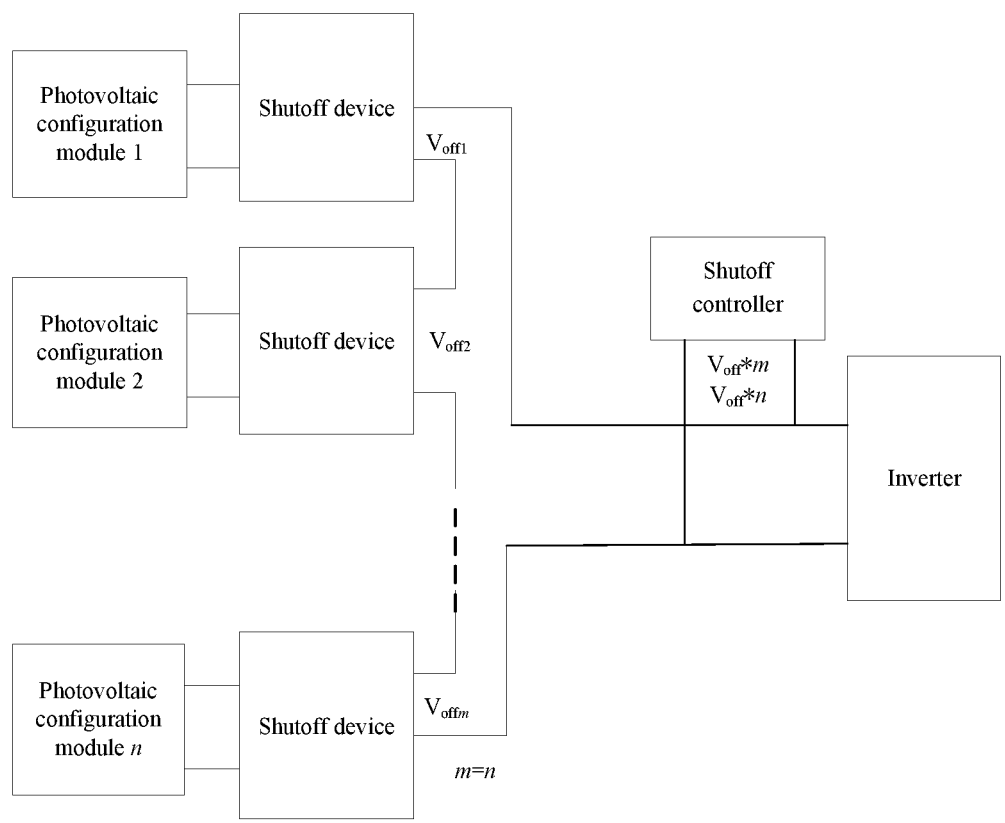
FIG. 1 is a schematic structural diagram of a photovoltaic system according to conventional technology.
Figure 2:
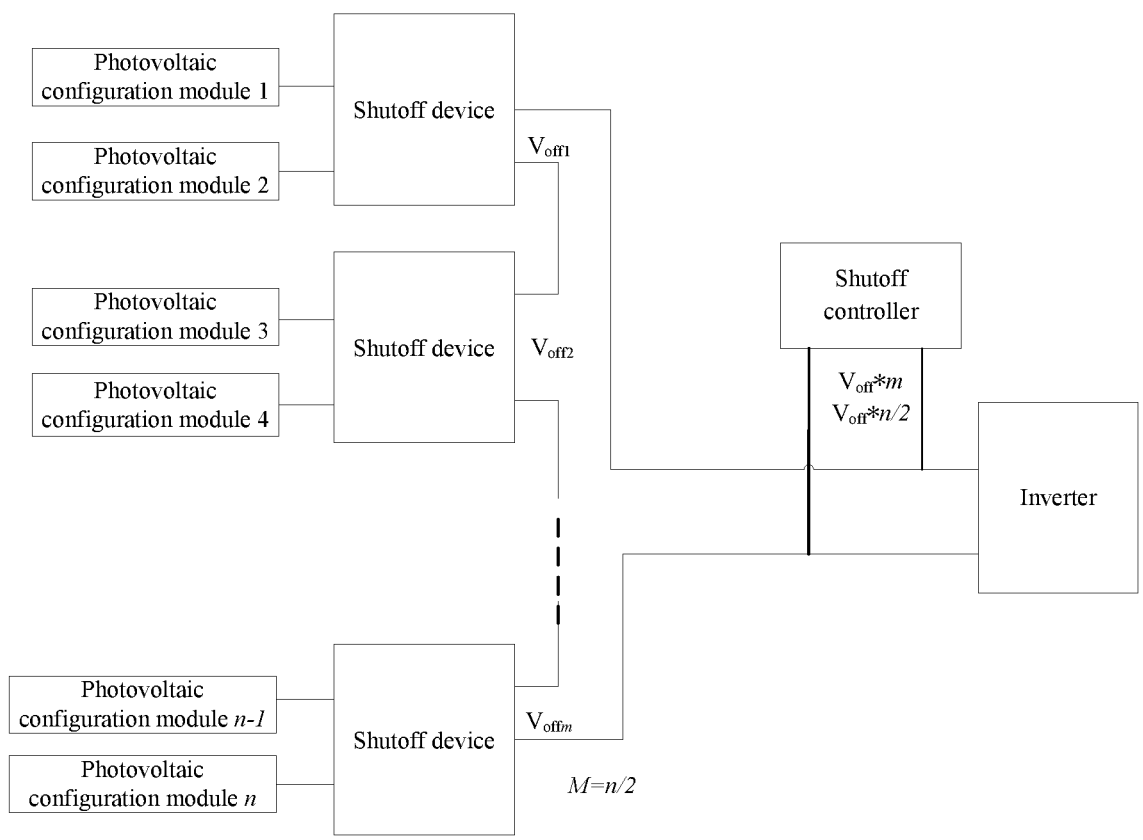
FIG. 2 is an another schematic structural diagram of a photovoltaic system according to conventional technology.
Figure 3:
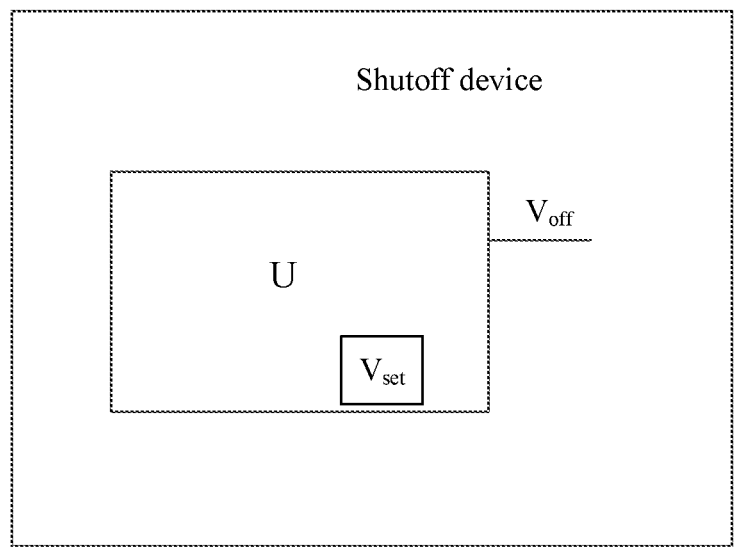
FIG. 3 is a structural diagram of a shutoff device according to an embodiment of the present disclosure.

Referring to FIG. 3, FIG. 3 a structural diagram of a shutoff device according to an embodiment of the present disclosure. The shutoff device includes a shutoff device control chip U, a voltage output port $V_{off}$ and a configuration module $V_{set}$ configured to adjust an output voltage of the voltage output port $V_{off}$ are provided in the chip U.

In the embodiment, a shutoff device with adjustable output voltage is provided, by which a design cost requiring for adjusting the connection structure between the shutoff device and the photovoltaic module in the photovoltaic system is significantly reduced.

Specifically, a shutoff device control chip U is provided in the shutoff device, a voltage output port $V_{off}$ and a configuration module $V_{set}$ configured to adjust the output voltage of the voltage output port $V_{off}$ are provided in the chip U. It can be understood that, since the voltage output port $V_{off}$ and the configuration module $V_{set}$ configured to adjust the output voltage of the voltage output port are provided in the chip U, the shutoff device output can output different voltage values by configuring the configuration module. It should be noted that, in practical application, the configuration module $V_{set}$ can be provided either inside or outside the chip U to meet the practical application requirements.

It can be understood that, in case that the output voltage of the shutoff device is adjustable, when a connection structure between the photovoltaic module and the shutoff device in the photovoltaic system changes, that is, a number of the photovoltaic modules connected with the shutoff device changes, it is only necessary to reconfigure the configuration module $V_{set}$ to achieve the purpose of adjusting the output voltage of shutoff device. Comparing with the conventional technology that all the shutoff devices in the photovoltaic system need to be replaced as a whole to ensure the safe and stable operation of the photovoltaic system, with the shutoff device provided in the embodiment, the design cost requiring for adjusting the connection structure between the shutoff device and the photovoltaic module in the photovoltaic system is significantly reduced.

It can be seen that, in the shutoff device provided in the present disclosure, since the shutoff device control chip is provided in the shutoff device, and a voltage output port and a configuration module configured to adjust the output voltage of the voltage output port are provided in the shutoff device control chip, the shutoff device output can output different voltage values by configuring the configuration module. In this case, when a connection structure between the shutoff device and the photovoltaic module in the photovoltaic system changes, it is only necessary to reconfigure the configuration module to achieve the purpose of adjusting the output voltage of shutoff device. Comparing with the conventional technology, by the setting the shutoff device in this way, the design cost requiring for adjusting the connection structure between the shutoff device and the photovoltaic module in the photovoltaic system can be significantly reduced.

Based on the embodiment above, the technical solutions are further illustrated and optimized in this embodiment. As a preferable embodiment, the configuration module $V_{set}$ is specifically a digital configuration module.

In practical application, the configuring module $V_{set}$ in the shutoff device may be a digital configuring module. That is, by grounding the digital configuration module to achieve a low level output of 0, or by connecting the digital configuration module to a power supply to achieve a high level output of 1, the shutoff device can output different voltage values.

As a preferable embodiment, the digital configuration module is provided with multiple digital channels.

Figure 4A:
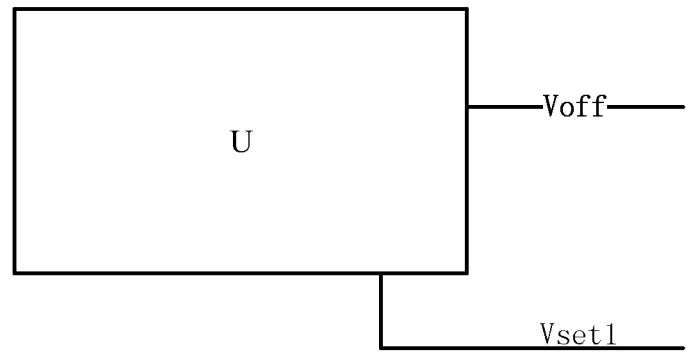
FIG. 4a is a schematic diagram of a digital configuration module provided with one digital channel in a shutoff device control chip.

Referring to FIG. 4a, FIG. 4a is a schematic diagram of a digital configuration module provided with one digital channel in a shutoff device control chip. $V_{set1}$ may be equivalent to an output pin led from the digital channel. By grounding $V_{set1}$, a low level output of 0 is achieved, and by connecting $V_{set1}$ to a power supply, a high level output of 1 is achieved, thus, the voltage output port $V_{off}$ on the shutoff device control chip can output different voltage values.

Figure 4B:
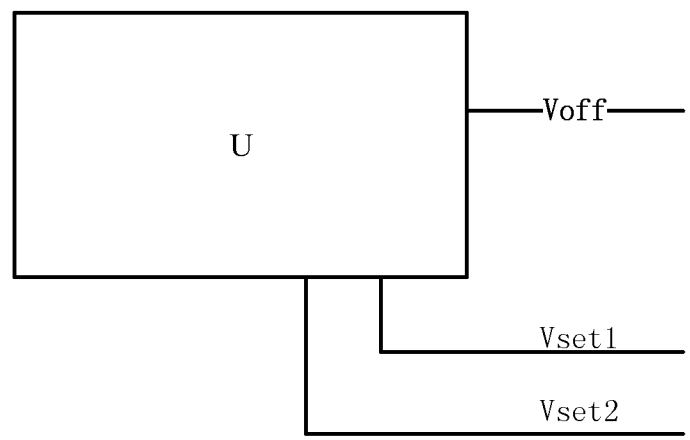
FIG. 4b is a schematic diagram of a digital configuration module provided with two digital channels in a shutoff device control chip.

Referring to FIG. 4b, FIG. 4b is a schematic diagram of a digital configuration module provided with two digital channels in a shutoff device control chip. $V_{set1}$ and $V_{set2}$ may be equivalent to two output pins led from two digital channels respectively. By assigning values to $V_{set1}$ and $V_{set2}$, the digital configuration module can have different output values. For example, $V_{set1}$ and $V_{set2}$ are set to 00, 01, 10 and 11 respectively, and by selecting a corresponding digital channel of the digital configuration module, it is possible to output different voltage values through the voltage output port of the chip U.

Based on the same design principle, in practical applications, multiple digital channels can be set on the digital configuration module, so that the voltage output port on the shutoff device control chip can output more different voltage values.

Based on the embodiments above, the technical solutions are further illustrated and optimized in this embodiment. As a preferable embodiment, the configuration module $V_{set}$ is specifically an analog configuration module.

In practical applications, the configuring module $V_{set}$ in the shutoff device control chip may also be an analog configuring module. It can be understood that, when the analog configuration module in the chip U has different voltage values, it can enable the shutoff device to output different voltage values.

As a preferable embodiment, a first resistor $R_1$ is connected between the voltage output port $V_{off}$ and the analog configuration module $V_{set}$, and a second resistor $R_2$ is connected between the analog configuration module $V_{set}$ and a ground.

Figure 5:
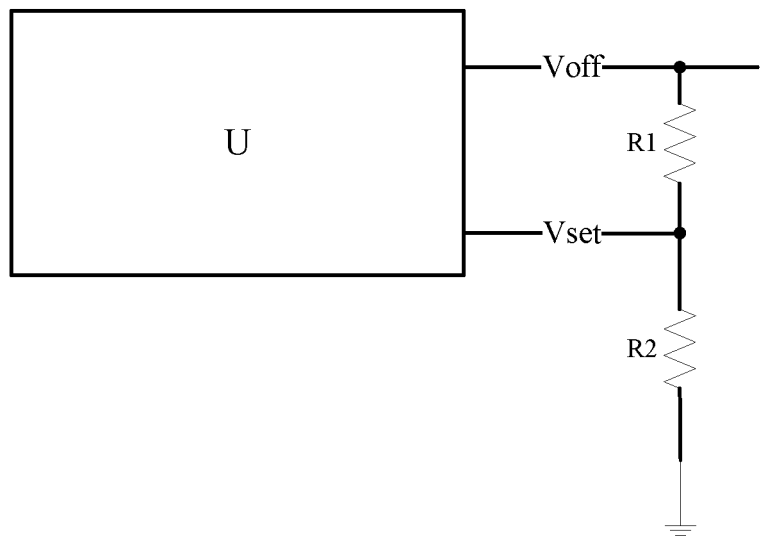
FIG. 5 is a structural diagram of a configuration module in the shutoff device control chip where the configuration module is an analog configuration module.

Referring to FIG. 5, FIG. 5 a structural diagram of a configuration module in the shutoff device control chip where the configuration module is an analog configuration module. In order to enable those skilled in the art to understand the working principle of the shutoff device provided in the embodiment more clearly, the analog configuration module $V_{set}$ is equivalent to an output pin $V_{set}$ of the shutoff device control chip U in the embodiment to illustrate specifically.

The shutoff device control chip is shown as FIG. 5, a first resistor $R_1$ is connected between a voltage output port $V_{off}$ and the analog configuration module $V_{set}$, and a second resistor $R_2$ is connected between the analog configuration module $V_{set}$ and a ground. By adjusting the resistance values of the first resistor $R_1$ and the second resistor $R_2$, the purpose of adjusting the output voltage of the shutoff device can be achieved.

In practical application, when the shutoff device control chip is set to the structure shown in FIG. 5, the output voltage of the shutoff device control chip represented by: $V_{off}=(R_1+R_2)/R_2*V_{ref}$, where, $R_1$ is a resistance value of the first resistor, $R_2$ is a resistance value of the second resistor, and $V_{ref}$ is a reference voltage.

Based on the embodiments above, the technical solutions are further illustrated and optimized in this embodiment. As a preferable embodiment, the shutoff device above further includes a remote server for sending a target control instruction to the configuration module.

In practical application, the remote server connected with the configuration module $V_{set}$ can be provided in the shutoff device. It can be understood that, after providing the remote server connected to the configuration module $V_{set}$ in the shutoff device, the remote server can be used to send a target controlling instruction to the configuration module $V_{set}$, and adjust the output voltage of the shutoff device. Thus, user experience when using the shutoff device is improved.

Based on the embodiments above, the technical solutions are further illustrated and optimized in this embodiment. As a preferable embodiment, the shutoff device further includes a standby configuration module.

It can be understood that, in practical application, it is inevitable to encounter situations where the configuration module $V_{set}$ of the shutdown device malfunctions or is damaged, resulting in the shutdown device being in an unusable state. In this embodiment, in order to avoid the occurrence of the above situation, a standby configuration module can also be provided in the shutoff device, so that even if the configuration module of the shutdown device is abnormal, staff can still use the standby configuration module to maintain the availability of the shutdown device.

Apparently, with the technical solutions provided in the embodiment, convenience of using the shutoff device for user can be relatively improved.

As a preferable embodiment, a number of standby configuration modules is M, where M is greater than or equal to 1.

Specifically, multiple standby configuration modules can be provided in the shutoff device. It can be understood that, through this setting method, even in the event of an abnormality or malfunction in one of the standby configuration modules of the shutdown device, user can adjust and set the output voltage of the shutdown device through other standby configuration modules, thereby further improving the user experience when using the shutdown device.

Figure 6:
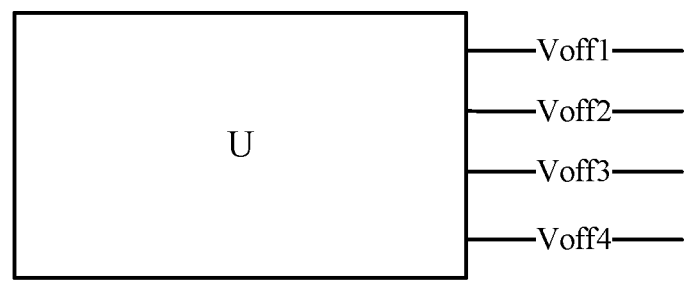
FIG. 6 is a diagram of a shutoff device control chip provided with multiple voltage output ports.

Alternatively, in practical applications, multiple voltage output ports with different voltage values can also be provided in the shutoff device control chip, referring to FIG. 6 for details. FIG. 6 is a diagram of a shutoff device control chip provided with multiple voltage output ports. The shutoff device control chip is provided with four voltage output ports, an output voltage of a first voltage output port is $V_{off1}$, an output voltage of a second voltage output port is $V_{off2}$, an output voltage of a third voltage output port is $V_{off3}$, and an output voltage of a fourth voltage output port is $V_{off4}$, where $V_{off1}$, $V_{off2}$, $V_{off3}$ and $V_{off4}$ are specified voltages set in advance. Apparently, when the shutoff device control chip is set up in this structural form, the voltage output port that can output a specific voltage in the chip can be selected according to actual needs of the shutoff device, which can further improve the convenience when using the shutoff device.

Correspondingly, a photovoltaic system is provided in the present disclosure, and the photovoltaic system includes any one of the shutoff devices provided above.

Figure 7:
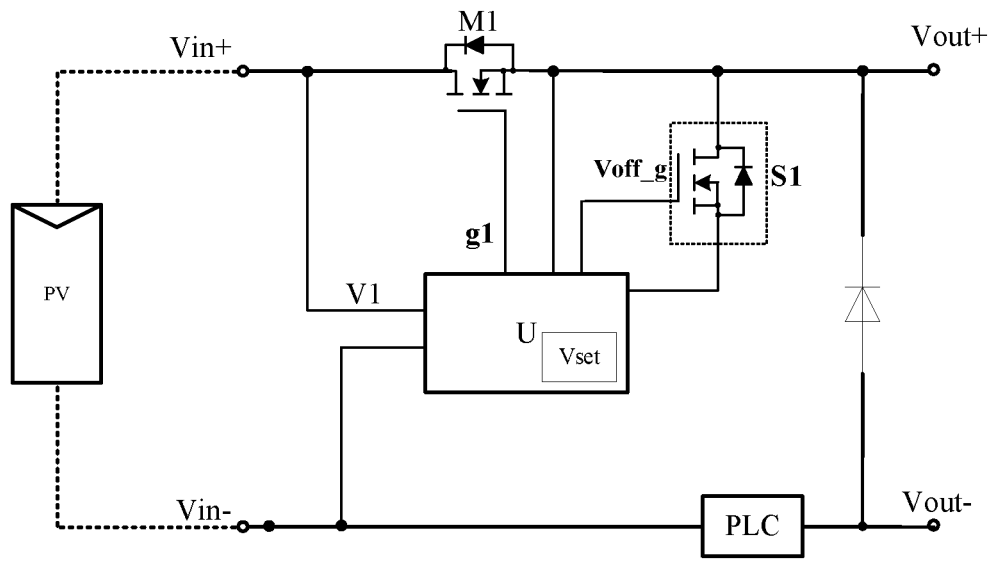
FIG. 7 is a structural diagram of a shutoff device connected to one photovoltaic module of a photovoltaic system.

Based on the shutoff device disclosed in the embodiments above, two specific photovoltaic systems are introduced to illustrate the working principle of the shutoff device in detail. Referring to FIG. 7, FIG. 7 is a structural diagram of a shutoff device connected to one photovoltaic module of a photovoltaic system. In the photovoltaic system, a chip shutoff device control U is connected to $V_{out+}$ through a switching transistor S1, where the switching transistor S1 is controlled by $V_{off\_g}$. When the chip U is turned off, the switching transistor S1 is turned on, a configuration module $V_{set}$ in the chip U is set in advance so that an output voltage between $V_{out+}$ and $V_{out-}$ is the output voltage of the photovoltaic module. That is, in the photovoltaic system shown in FIG. 7, the output voltage of the shutoff device control chip is equal to the output voltage of the photovoltaic module.

Figure 8:
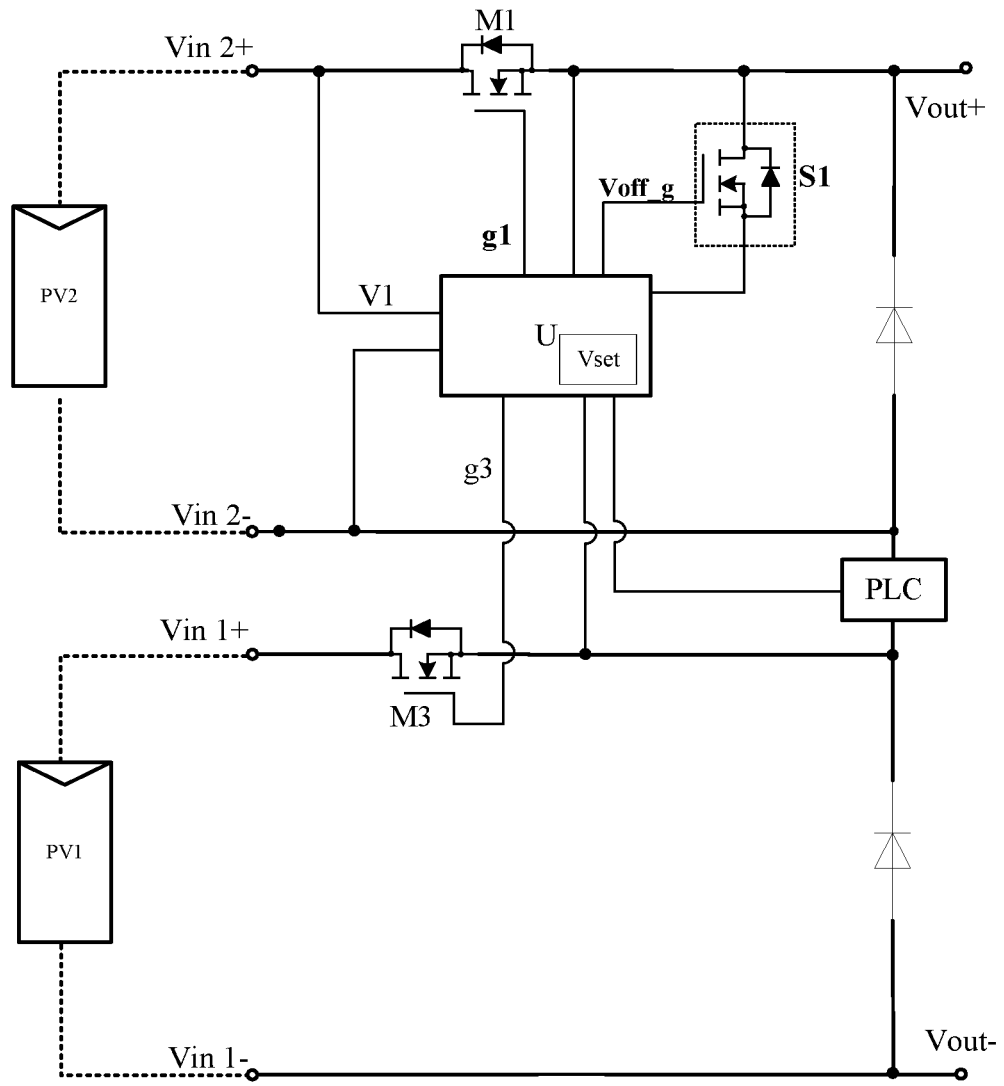
FIG. 8 is a structural diagram of a shutoff device connected to two photovoltaic modules of a photovoltaic system.

Referring to FIG. 8, FIG. 8 is a structural diagram of a shutoff device connected two photovoltaic modules of a photovoltaic system. In the photovoltaic system, a shutoff device control chip U is connected to $V_{out+}$ through a switching transistor S1, where the switching transistor S1 is controlled by $V_{off\_g}$. When the shutoff device control chip U is turned off, the switching transistor S1 is turned on, a configuration module $V_{set}$ in the chip U is set in advance so that an output voltage between $V_{out+}$ and $V_{out-}$ is the total voltage of the two photovoltaic modules connected in series. The output voltage of the shutoff device shown in FIG. 8 is twice that of the output voltage of the shutoff device shown in FIG. 7.

Apparently, in the embodiments, since a voltage output port and a configuration module configured to adjust the output voltage of the voltage output port are provided in the shutoff device control chip, the shutoff device output can output different voltage values by configuring the configuration module. In this case, when a connection structure between the shutoff device and the photovoltaic module in the photovoltaic system changes, it is only necessary to reconfigure the configuration module to achieve the purpose of adjusting the output voltage of shutoff device. Comparing with the conventional technology, by the setting the shutoff device in this way, the design cost requiring for adjusting the connection structure between the shutoff device and the photovoltaic module in the photovoltaic system can be significantly reduced.

Each embodiment in this specification is described in a progressive manner, and each embodiment focuses on the differences from other embodiments. The same or similar parts of each embodiment can be referred to each other. Finally, it should be noted that in the present disclosure, relational terms such as first and second are used only to distinguish one entity or operation from another, and do not necessarily require or imply any such actual relationship or order between entities or operations. In addition, the terms "including", "comprising" or any other variant thereof used herein are intended to be non-exclusive inclusion. So that a process, method, article or apparatus including a series of elements includes not only those elements, but also other elements not expressly listed, or elements inherent to the process, method, article or apparatus. Unless expressively limited otherwise, the element defined by the statement "comprising (including) a . . . " does not exclude the case that other same elements may exist in the process, method, article or apparatus including the element.

A shutoff device and a photovoltaic system provided in the present disclosure are introduced in detail above, and specific examples are used to describe the principles and embodiments of the present disclosure in this paper. The descriptions of the embodiments above are only used to understand the method of the present disclosure and its core ideas; meanwhile, for the those skilled in the art may make changes on specific implementation of embodiments and application scope according to the idea of the present disclosure. In summary, the content of this specification should not be understood as a limitation of the present disclosure.

Figure 9:
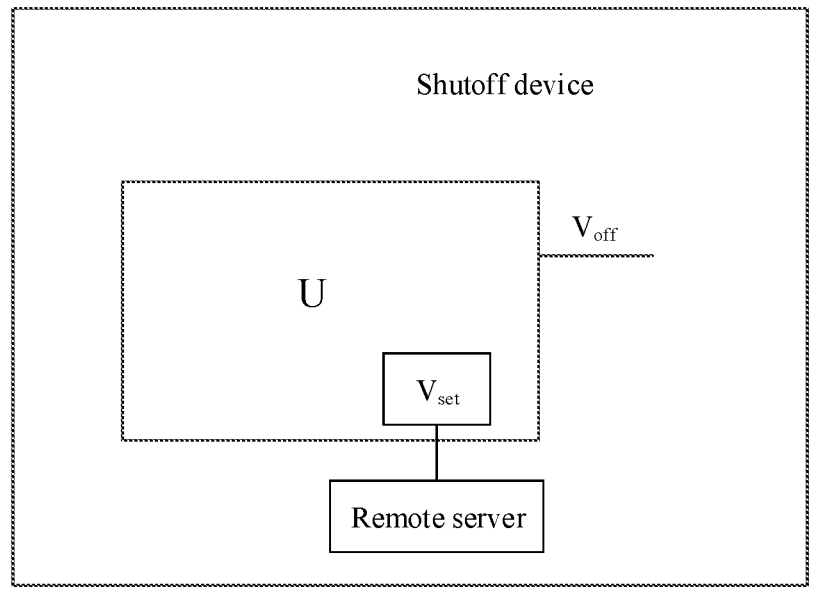
Figure 10:
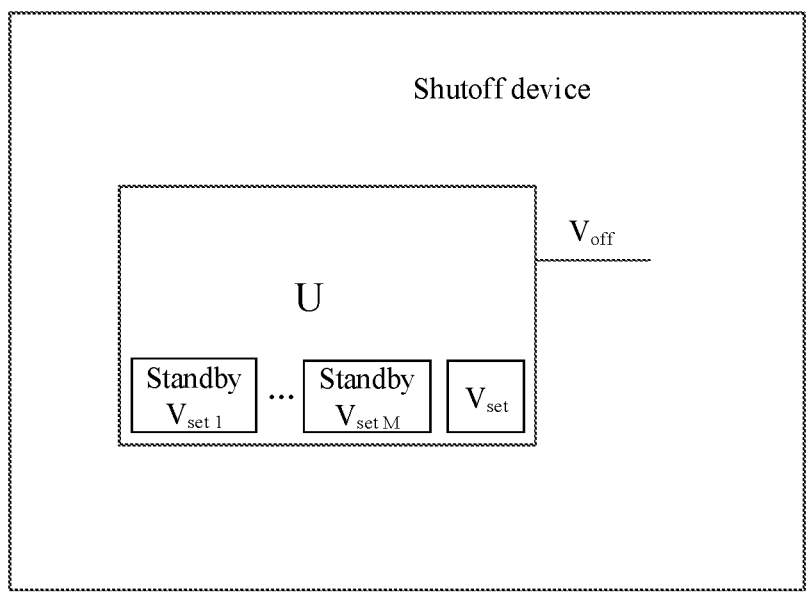

FIG. 9 is a structural diagram of a shutoff device including a remote server according to an embodiment of the present disclosure; and FIG. 10 is a structural diagram of a shutoff device including M (M≥1) standby configuration modules according to an embodiment of the present disclosure.

The invention claimed is:

1. A shutoff device, comprising a shutoff device control chip, wherein the shutoff device control chip comprises:
   a voltage output port; and
   a configuration module configured to adjust an output voltage of the voltage output port,
   wherein the configuration module is an analog configuration module, a first resistance is connected between the voltage output port and the analog configuration module, and a second resistance is connected between the analog configuration module and a ground.

2. The shutoff device according to claim 1, wherein the configuration module is a digital configuration module.

3. The shutoff device according to claim 2, wherein the digital configuration module is provided with a plurality of digital channels.

4. The shutoff device according to claim 1, further comprising:
   a remote server configured to send a target control instruction to the configuration module.

5. The shutoff device according to claim 1, further comprising:
   a standby configuration module.

6. The shutoff device according to claim 5, wherein a number of the standby configuration modules is M, wherein M is greater than or equal to 1.

7. A photovoltaic system, comprising a shutoff device, wherein the shutoff device comprises a shutoff device control chip, and the shutoff device control chip comprises:
   a voltage output port; and
   a configuration module configured to adjust an output voltage of the voltage output port,
   wherein the configuration module is an analog configuration module, a first resistance is connected between the voltage output port and the analog configuration module, and a second resistance is connected between the analog configuration module and a ground.

8. The photovoltaic system according to claim 7, wherein the configuration module is a digital configuration module.

9. The photovoltaic system according to claim 8, wherein the digital configuration module is provided with a plurality of digital channels.

10. The photovoltaic system according to claim 7, further comprising:
    a remote server configured to send a target control instruction to the configuration module.

11. The shutoff device according to claim 7, further comprising:
    a standby configuration module.

12. The photovoltaic system according to claim 11, wherein a number of the standby configuration modules is M, wherein M is greater than or equal to 1.

* * * * *